United States Patent
Baruschke et al.

[19]

[11] Patent Number: 5,967,185
[45] Date of Patent: Oct. 19, 1999

[54] ROTARY VALVE

[75] Inventors: Wilhelm Baruschke, Wangen; Oliver Kaefer, Murr; Karl Lochmahr, Vaihingen, all of Germany

[73] Assignee: Behr GmbH & Co., Stuttgart, Germany

[21] Appl. No.: 08/989,823

[22] Filed: Dec. 12, 1997

[30] Foreign Application Priority Data

Dec. 12, 1996 [DE] Germany .......................... 196 51 622

[51] Int. Cl.[6] .............................................. F16K 11/076
[52] U.S. Cl. .......................... 137/625.29; 165/DIG. 109
[58] Field of Search ............. 137/625.29; 165/DIG. 109

[56] References Cited

U.S. PATENT DOCUMENTS

| | | | |
|---|---|---|---|
| 925,692 | 6/1909 | Gold | 137/625.29 X |
| 4,361,170 | 11/1982 | Peloza | 137/625.29 |
| 4,874,010 | 10/1989 | DeJong et al. | 137/625.29 X |
| 5,529,026 | 6/1996 | Kurr et al. | 123/41.1 |

FOREIGN PATENT DOCUMENTS

| | | |
|---|---|---|
| 0 541 995 | 5/1993 | European Pat. Off. . |
| 1 010 342 | 6/1957 | Germany . |
| 31 47 511 | 6/1983 | Germany . |
| 33 04 678 | 8/1984 | Germany . |
| 43 24 749 | 1/1995 | Germany . |

*Primary Examiner*—Gerald A. Michalsky
*Attorney, Agent, or Firm*—Foley & Lardner

[57] ABSTRACT

A rotary fluid-control valve for controlling fluid flow has a cylindrical valve chamber, a dove-tail shaped valve body mounted rotatably in the valve chamber and movable between an open position and a closed position, and four fluid passages extending from the valve chamber. The passages are arranged essentially parallel with respect to one another and the valve body is pivotally connected to the valve chamber with a pivot pin extending in the axial direction of the valve chamber. The passages extend perpendicular to the pivot pin. The valve chamber has a convex section that, when the valve body is rotated out of the closed position, causes an asymptotic rise in the throughflow quantity. A stop or pressure equalizing projection projects into the valve chamber and is dimensioned so that a pressure drop in the closed position of the valve body corresponds to a pressure drop of the radiator in the open position of the valve body. The valve body further has a concave portion extending along one side of the first and second valve arms to provide a homogenous bypass flowthrough through the valve chamber.

19 Claims, 2 Drawing Sheets

ROTARY VALVE

BACKGROUND OF THE INVENTION

Rotary valves are known in general for controlling or regulating a fluid flow. EP 0 541 995 A1, for example, discloses a rotary valve for a motor-vehicle heating system, where fluid can be fed within a circuit to a vehicle engine and/or to a radiator. In addition, DE 43 24 749 A1 discloses a rotary regulating valve that has a valve body mounted rotatably in a valve chamber and extending in the circumferential direction of the valve chamber along certain areas thereof. The inlets and outlets of the known rotary valve are arranged in a star-shaped manner with respect to one another, the longitudinal axes of these inlets and outlets converging in the direction of the pivot pin of the valve body. However, the inlets and outlets of the known rotary valve arranged in a star-shaped manner with respect to one another are disadvantageous.

SUMMARY OF THE INVENTION

The present invention thus relates to a rotary fluid-control valve, which can have a reduced space requirement. The present valve can be used, for example, for controlling fluid in a circuit having at least one heat exchanger and a radiator. According to the invention, the rotary valve comprises a valve chamber, a valve body mounted rotatably in the valve chamber, and at least three, first, second, and third, fluid passages extending from and communicating with the valve chamber, and adapted to pass fluid, The valve can be moved between an open position and a closed position.

The valve body has a portion extending in a peripheral direction of the valve chamber to open and close one of the passages. The passages are preferably arranged essentially parallel with respect to one another and the valve body is pivotally connected to the valve chamber with a pivot pin, which intersects a straight line extending parallel to the passages.

According to one aspect of the invention, the valve body is movable to the open position to communicate between the first and second passages and is movable to the closed position to communicate the first and third passages.

The rotary valve can also have a fourth passage connected to the valve chamber. The straight line runs between a first pair of the passages, which comprise a first inlet and a first outlet and a second pair of the passages, which comprise a second inlet and a second outlet. The fourth passage also extends from and communicates with the valve chamber. The valve body in the open position also communicates the third and fourth passages. In the closed position, the valve body blocks communication between the second and fourth passages, while permitting communication between the first and third passages.

According to another aspect of the invention, the first pair of the passages are substantially collinear and the second pair of the passages are substantially parallel.

According to another aspect of the invention, the valve chamber has a cylindrical cross-section and the valve body has two valve arms located diametrically opposite one another within the valve chamber. The first valve arm has a portion extending in a circumferential direction of the valve chamber and is adapted to open and close one of the passages. The first valve arm preferably closes the second passage.

According to another aspect of the invention, the valve chamber has a convex section that, when the valve body is rotated out of the closed position, causes an asymptotic rise in the throughflow quantity through the first outlet. The convex section preferably extends from the cylindrical valve chamber with a larger radius than the radius of the cylindrical value chamber.

According to another aspect of the invention, the cylindrical valve chamber has a first stop to engage the first arm, and position the valve body in a closed position. The cylindrical valve chamber can also have a second stop to engage the second valve arm in the open position and a third stop to engage the second valve arm in the closed position.

According to another aspect of the invention, a pressure equalizing projection protects into the valve chamber and is positioned in the path of flow between the first and third passages to compensate a pressure difference between fluid passing through the first and second passages in the open position and the first and third passages in the closed position. This projection comprises the third stop, which preferably extends radially inwardly toward the pivot pin and is preferably dimensioned so that a pressure drop in the closed position of the valve body corresponds to a pressure drop of the radiator in the open position of the valve body.

According to another aspect of the invention, the valve body is dovetail shaped, with the first valve arm being wider and tapering to a narrower section in the direction of the second valve arm. The valve body further has a concave portion extending along the first and second valve arms to provide a homogenous bypass flowthrough through the valve chamber from the first inlet to the second outlet. The concave portion is exposed in a flow path extending between the first and second passages in the open posit ion and is exposed to a flow path extending between the first and third passages in the closed position.

According to another aspect of the invention, the diameter of the valve chamber is about twice the diameters of the passages.

BRIEF DESCRIPTION OF THE DRAWINGS

These and other features, aspects, and advantages of the present invention will become more apparent from the Following description, appended claims, and accompanying exemplary embodiments illustrated in the drawings described below.

DETAILED DESCRIPTION OF THE PREFERRED EMBODIMENT

Figure 1:
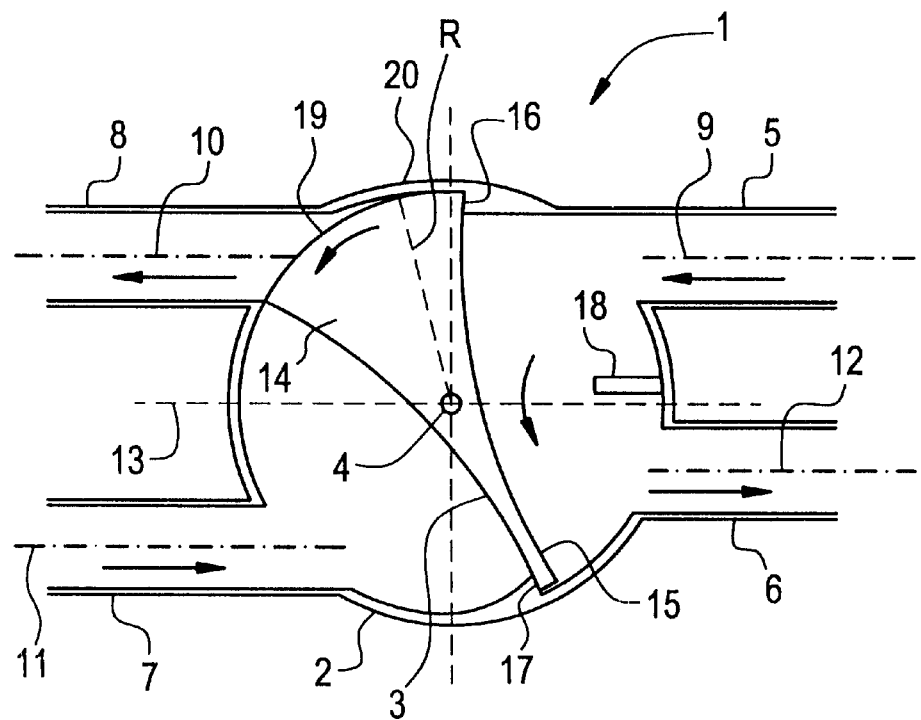
FIG. 1 shows a cross-section through a rotary valve in a closed position.
Figure 2:
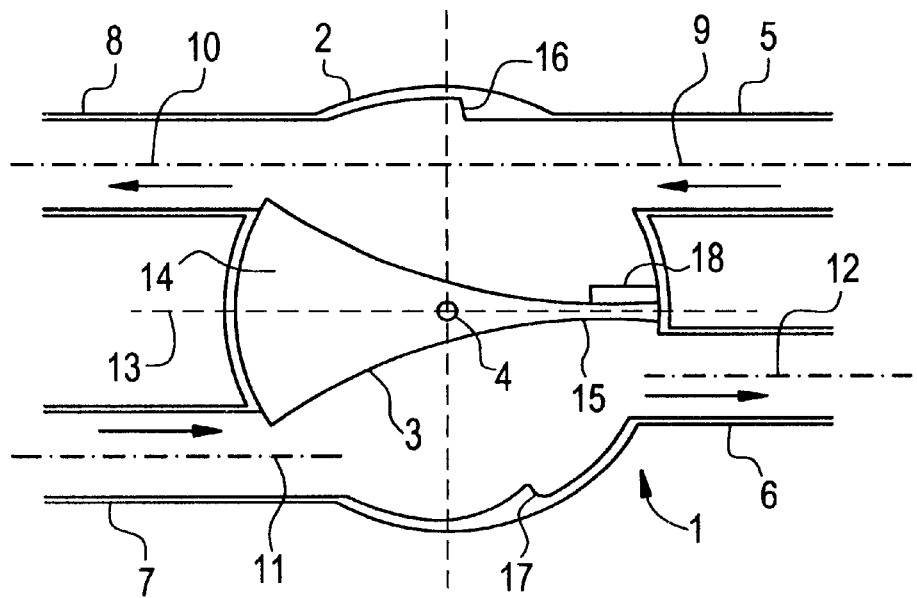
FIG. 2 shows a cross-section through the rotary valve in the open position.

FIG. 1 shows a rotary valve 1 that can control or regulate the quantity of fluid flowing through from a vehicle engine to a radiator. The rotary valve 1 comprises a cylindrical valve chamber 2 and a valve body 3 rotatably mounted to the valve chamber 2 using a pivot pin 4 preferably extending along the axis of the cylindrical valve chamber 2. The valve body 3 can be rotated manually or by a motor (not shown), in particular by an electrical drive of a stepping motor. Passages, an inlet 5 and an outlet 6, can extend on the engine side and additional passages, an inlet 7 and an outlet 8, can extend on the radiator side. These passages 5, 6, 7, and 8 can all lie approximately in the same plane, as shown in FIGS. 1 and 2. The passages 5, 6, 7, and 8 are preferably tubular, adapted for connection to a vehicle engine and a radiator (both not illustrated), using appropriate connecting tubes or hoses (not illustrated), of a heating or air-conditioning system. The passages 5, 6, 7, and 8 are preferably connected integrally to the valve body 3. A longitudinal axis 9 of the inlet 5 is arranged preferably collinearly with respect to a longitudinal axis 10 of the radiator-side outlet 8 while a longitudinal axis 11 of the radiator-side inlet 7 is arranged preferably parallel with respect to a longitudinal axis 12 of the engine-side outlet 6. The longitudinal axes 9, 10, 11, and 12 are each arranged parallel to a straight line 13 that intersects the pivot pin 4 of the valve body 3. In this case, the longitudinal axes 8 and 9 run above the straight line 13 and the longitudinal axes 11, 12 run beneath the straight line 13, with respect to FIGS. 1 and 2.

The valve body 3 is designed in the form of a dovetail and has a first valve arm 14, which extends over an acute angle in the circumferential direction of the cylindrical valve charmer 2, and a thinner, second valve arm 15, which is located diametrically opposite the first valve arm. As can be seen from FIG. 1, the valve chamber 2 has a first stop 16 formed at the top and a second stop 17 formed at the bottom. The respective edges of the first and second valve arms 14 and 15 can rest against the stops 16 and 17 in its closed position.

To achieve an open position, as illustrated in FIG. 2, the valve body 3 is rotated in the counterclockwise direction until an end portion of the second valve arm 15 strikes against a third stop 18, which projects radially inwardly into the valve chamber 2. In this position, the opening cross-sections of the passages 5, 6, 7, and 8 are fully open. In the closed position, as illustrated in FIG. 1, the opening cross-section of the outlet 8 is fully covered by an arcuate (lateral) surface 19 of the first valve arm 14 so that there is no radiator-side flow via the radiator-side inlet 7 into the radiator-side outlet 8. In tile closed position, the first and second arms 14 and 15 act as a bypass to allow fluid from the engine to flow through the inlet 5 and, after being deflected by the valve body 3, through the outlet 6 and back to the engine. Thus, when the valve body 3 is rotated out of the closed position into the open position, a flow bypass of the radiator is avoided in an effective manner.

When rotary valve 1 is opened to the open position, fluid pressure drops because fluid flows through the radiator. To ensure uniform operating conditions in the closed position, the stop 16 projects, preferably radially, into the valve chamber 2 from its cylindrical wall in the direction of the pivot pin 4 and is positioned in the path of flow between the inlet 5 and the outlet 6. Its radial extent is selected so that the associated reduction in cross-section corresponds to the drop in pressure of fluid through the radiator in the open position. That is, in the closed position of the rotary valve 1, the radially inwardly projecting stop 18 creates a pressure drop corresponding to the drop in Pressure of the radiator in the open position. This avoids the occurrence of pressure peaks in the coolant circuit in each position of the valve body 3. This stop 18 thus provides the means for regulating and further improving the characteristics of the rotary valve 1.

Alternatively, it is also possible for this forced drop in pressure to be produced by a convex section on the valve body 3. However, this would have flow-related disadvantages with the deflection of the coolant stream in the closed position.

According to the preferred exemplary embodiment described, the valve body 3 has a concave portion or side at least for the engine side to homogeneously deflect fluid toward the outlet 6 in the closed position of the rotary valve 1. Specifically, the concave portion extends between the ends of the first and second arms 14 and 15 and forms the flow path connecting the inlet 5 and the outlet 8 in the open position and forms the flow path connecting the inlet 5 and the outlet 6 in the closed position. In the exemplary embodiment, two concave portions extend along the first and second arms 14 and 15 so that the second concave portion also extends between the ends of the first and second arms 14 and 15 and forms the flow path connecting the inlet 7 and the outlet 6.

Figure 3A:
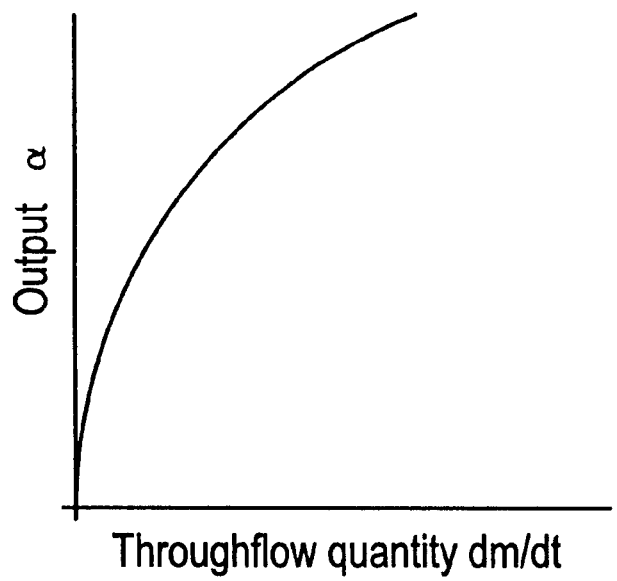
FIG. 3a shows a heating characteristic curve of a heat exchanger connected to the rotary valve.
Figure 3B:
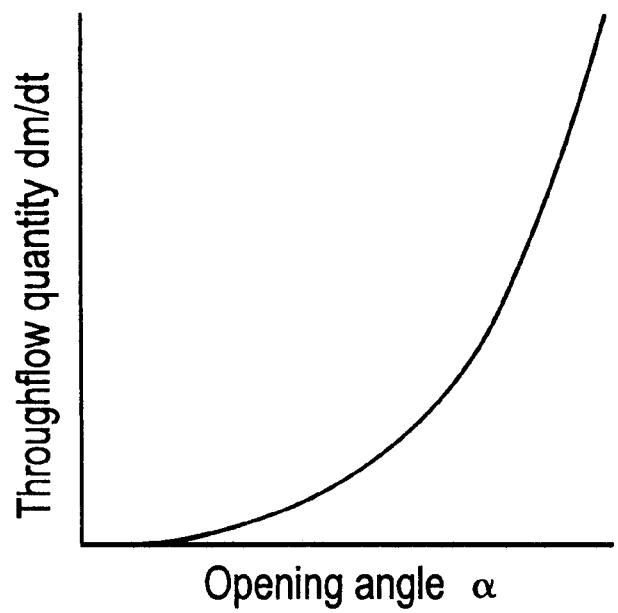
FIG. 3b shows the progression of the characteristic curve of the rotary valve versus an opening angle α.

FIG. 3a shows a characteristic curve of the radiator connected to the rotary valve 1. It can be seen from this figure that, as the throughflow quantity increases, the output rises very sharply in an initial region, whereas the characteristic curve flattens out increasingly as the throughflow quantity increases. FIG. 3b shows the characteristic curve of the rotary valve 1, the opening angle $\alpha$ being indicated on the abscissa and the throughflow quantity being indicated on the ordinate. The characteristic curve of the rotary valve 1 gradually rises asymptotically with a shallow incline in an initial region, with the greatest incline in an end region. The initial slow asymptotic rise in the throughflow quantity is achieved by a convex section 20, which runs in extension of the outlet 8, as a constituent part of the valve chamber 2, over a circumferential region of the latter. In the region of the convex section 20, the valve chamber 2 has a larger radius R than in any other circumferential region. The convex section 20 enlarges the opening cross-section of the outlet 8, the opening cross-section of the outlet 8 corresponding to the circumferential surface of the arcuate lateral surface 19. As the valve body 3 is rotated out of the closed position, the opening cross-section of the outlet 8 is increased slowly so that only a small throughflow quantity can flow in the direction of the outlet 8. This initial region, in which the throughflow quantity rises to a small extent, covers at least an opening-angle range of from 0°–20. This slow rise in the throughflow quantity in an initial region is advantageously assisted in that the outlet 8 is located over an acute angle with respect to a center plane of the valve chamber 2. As a result of this arrangement alone, the opening cross-section of the outlet 8 changes more slowly than, for example, if the longitudinal axis 10 of the outlet 8 intersects (parallel to) the pivot pin 4, which is at the axis of symmetry of the valve chamber 2, The greater the acute angle between the outlet 8 and the center plane of the valve chamber 2, the slower the rise in the characteristic curve of the valve according to FIG. 3b. According to the present exemplary embodiment, the arrangement of the outlet 8 with respect to the center plane of the valve chamber 2, on the one hand, and the formation of a convex section 20, on the other hand, make it possible to provide a rotary-valve characteristic curve according to FIG. 3b, which compensates for the sharp rise in the radiator characteristic curve according to FIG. 3a in an initial region, thus resulting in a formation of an essentially linear progression for the characteristic curve of the radiator. This allows the output of the radiator to be adjusted in a substantially linear manner via the opening angle $\alpha$. The heating output can thus be controlled in a largely linear manner by a substantially linear actuation characteristic of the rotary valve 1.

The valve body 3 is preferably connected to an electric motor to control the opening and closing. Alternatively, it is also possible for the valve body 3 to be adjusted manually or by a lifting magnet. The stops 16, 17, and 18 also provide a defined end position for the valve body 3.

Thus, according to the invention, the collinear or axis-parallel arrangement of the passages (inlets or outlets) of the rotary valve provides, in a simple manner, a rotary valve that can be arranged within a fluid circuit in a space-saving manner. For example, the rotary valve can be used in a space-saving manner within a motor vehicle as an integral part of a heating system. In this case, the rotary valve serves for controlling or regulating the quantity of fluid flowing through from the motor-vehicle engine to the radiator and vice versa.

According to one configuration of the invention, the diameter of the valve chamber corresponds essentially to twice the tube diameter of the inlets and outlets. This provides a space-saving design of the rotary valve, the transverse extent of the valve chamber being predetermined by the necessary spacing of two adjacent tubes.

In another configuration of the invention, the valve chamber may be connected integrally with the passages, e.g., inlets and outlets, that extend from the chamber. Alternatively, it is also possible for the valve chamber to be connected to the appropriate passages via a known flange connection.

In one development of the invention, the valve body is designed in the form of a dovetail with a first valve arm and a second valve arm located opposite the latter, the first valve arm extending over an acute angle in the circumferential direction. This measure means that, when the valve body is rotated from a closed position into an open position, the quantity of fluid flowing through rises essentially parabolically. In conjunction with the characteristic curve of the radiator, this gives a virtually linear progression of the heating-output curve over the angle of rotation. As a result, it is possible to obtain a virtually linear heating-output characteristic curve when the rotary valve is actuated.

According to one configuration of the invention, the asymptotic rise in the throughflow, when the valve body is rotated out of the closed position, is made possible by a convex section 20 in one region of the outlet 8 of the valve chamber. This convex section may advantageously form a stop 16 in one end region, the valve body resting against the stop in the closed position.

In one development of the invention, the valve body is of a concave design, which forms, in the closed position of the valve body, a bypass duct for deflecting the cooling fluid from the inlet in the direction of the outlet. At the same time, the concave shape of the valve body allows a homogenous throughflow of the cooling fluid through the valve chamber.

In another configuration of the invention, the valve chamber has a radially inwardly projecting stop 18 that secures the valve body in the open position, Furthermore, in the closed position of the valve, this stop causes a drop in pressure corresponding to the drop in pressure in the connected heat exchanger in the open position of the valve. This means make it possible to maintain virtually the same drop in pressure in each position of the valve, avoiding pressure peaks in the coolant circuit.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The disclosure of German priority application 196 51 622.6 is incorporated herein by reference in its entirety, including the drawings, claims, and the specification thereof.

We claim:

1. A rotary valve for controlling fluid in a circuit having at least one heat exchanger and a radiator, the rotary valve comprising:

a substantially cylindrical valve chamber having a convex section;

a valve body mounted rotatably in the valve chamber, rotatable between an open position and a closed position, and having a portion extending in a peripheral direction of the valve chamber; and at least first, second, and third passages extending from and communicating with the valve chamber and adapted to pass fluid therebetween, the valve body providing fluid communication between the first and second passages when the valve body is in the open position, and providing fluid communication between the first and third passages when the valve body is in the closed position, wherein the valve body is pivotal about an axis of the cylindrical valve chamber, and wherein, the convex section is adjacent to the second passage so that when the valve body is rotated out of the closed position to the open position, the convex section causes an asymptotic rise in the throughflow quantity through the second passage.

2. A rotary valve according to claim 1, further comprising a fourth passage connected to the valve chamber, wherein the first and second passages respectively comprise a first inlet and a first outlet, and the fourth and third passages respectively comprise a second inlet and a second outlet.

3. A rotary valve according to claim 2, wherein the first and second passages are substantially collinearly arranged and the third and fourth passages are substantially parallel, wherein fluid flow through the first inlet and the second inlet is in opposite directions.

4. A rotary valve according to claim 2, wherein the valve body has two valve arms located diametrically opposite one another within the valve chamber, the first valve arm having a portion extending in a circumferential direction of the valve chamber and adapted to open and close the second passage.

5. A rotary valve according to claim 4, wherein the cylindrical valve chamber has a first stop to engage the first arm and position the valve body in a closed position.

6. A rotary valve according to claim 5, wherein the cylindrical valve chamber has a second stop to engage the second valve arm in the open position and has a third stop to engage the second valve arm in the closed position.

7. A rotary valve according to claim 6, wherein the valve body is rotable about a pivot pin extending axially of the valve chamber, the third stop extending toward the pivot pin, the third stop being dimensioned so that a pressure drop in the closed position of the valve body corresponds to a pressure drop of the radiator in the open position of the valve body.

8. A rotary valve according to claim 4, wherein the valve body is dovetail shaped, with the first valve arm being wider and tapering to a narrower section in the direction of the second valve arm.

9. A rotary valve according to claim 8, wherein the valve body has a concave portion extending along the first and second valve arms to provide a homogenous bypass flowthrough through the valve chamber from the first inlet to the second outlet.

10. A rotary valve according to claim 4, wherein the diameter of the valve chamber is about twice the diameters of the passages.

11. A rotary valve according to claim 1, wherein the convex section extends from the cylindrical valve chamber with a larger radius than the radius of the cylindrical valve chamber.

12. A rotary valve comprising:

a substantially cylindrical valve chamber having a convex section;

a valve body mounted rotatably in the valve chamber about an axis of the cylindrical valve chamber and rotatable between an open position and a closed position, and having a portion extending in a peripheral direction of the valve chamber;

at least first, second, and third fluid passages extending from and communicating with the valve chamber, wherein the valve body is rotatable to the open position to communicate the first and second passages and is rotatable to the closed position to communicate the first and third passages, wherein the convex section is adjacent to the second passage so that when the valve body is rotated out of the closed position to the open position, the convex section causes an asymptotic rise in the throughflow quantity through the second passage.

13. A rotary valve according to claim 12, further including a fourth passage extending from and communicating with the valve chamber, wherein the valve body in the open position also communicates third and fourth passages.

14. A rotary valve according to claim 13, wherein the valve body, when in the closed position, blocks communication between the second and fourth passages, while permitting communication between the first and third passages.

15. A rotary valve according to claim 12, further comprising a pressure equalizing projection that projects into the valve chamber and positioned in a flow path between the first and third passages to compensate a pressure difference between fluid passing through the first and second passages in the open position and the first and third passages in the closed position.

16. A rotary valve according to claim 15, wherein the valve chamber comprises a substantially cylindrical body, wherein the valve body comprises a first valve arm and a second valve arm located diametrically opposite to the first valve arm.

17. A rotary valve according to claim 16, wherein the valve body is dovetail shaped, with the first valve arm being wider and the second valve arm being narrower.

18. A rotary valve according to claim 17, wherein the valve body has at least one concave portion extending along one side of the first and second valve arms, the concave portion being exposed in a flow path extending between the first and second passages in the open position and being exposed to a flow path extending between the first and third passages in the closed position.

19. A rotary valve according to claim 18, wherein the first valve arm closes the second passage.

\* \* \* \* \*